US010455775B2

(12) United States Patent
Sokhi

(10) Patent No.: US 10,455,775 B2
(45) Date of Patent: Oct. 29, 2019

(54) SYSTEM FOR GROWING PLANT UNDER SHADE

(71) Applicant: Sukhbir Singh Sokhi, Ludhiana Punjab (IN)

(72) Inventor: Sukhbir Singh Sokhi, Ludhiana Punjab (IN)

(*) Notice: Subject to any disclaimer, the term of this patent is extended or adjusted under 35 U.S.C. 154(b) by 64 days.

(21) Appl. No.: 15/102,069

(22) PCT Filed: Nov. 14, 2014

(86) PCT No.: PCT/IB2014/066030
§ 371 (c)(1),
(2) Date: Jun. 6, 2016

(87) PCT Pub. No.: WO2015/083019
PCT Pub. Date: Jun. 11, 2015

(65) Prior Publication Data
US 2016/0302367 A1    Oct. 20, 2016

(30) Foreign Application Priority Data
Dec. 8, 2013  (IN) .......................... 3557/DEL/2013

(51) Int. Cl.
| *A01G 9/24* | (2006.01) |
| *A01G 22/00* | (2018.01) |
| *A01G 7/04* | (2006.01) |
| *F21V 8/00* | (2006.01) |

(52) U.S. Cl.
CPC ............... *A01G 9/243* (2013.01); *A01G 7/04* (2013.01); *A01G 22/00* (2018.02); *G02B 6/0096* (2013.01); *Y02A 40/266* (2018.01); *Y02P 60/124* (2015.11)

(58) Field of Classification Search
CPC .......... A01G 9/243; A01G 7/04; A02G 1/001; G02B 6/0096; Y02P 60/124
See application file for complete search history.

(56) References Cited

U.S. PATENT DOCUMENTS

| 4,246,477 A * | 1/1981 | Latter | F21S 2/00 |
| | | | 250/214 AL |
| 4,297,000 A * | 10/1981 | Fries | F21S 11/00 |
| | | | 362/557 |
| 4,720,170 A * | 1/1988 | Learn, Jr. | F21S 11/00 |
| | | | 359/597 |
| 5,907,648 A * | 5/1999 | Miller | F21S 8/026 |
| | | | 362/560 |
| 6,057,504 A * | 5/2000 | Izumi | F03G 6/001 |
| | | | 136/246 |
| 6,142,645 A * | 11/2000 | Han | E04D 13/0325 |
| | | | 362/147 |

(Continued)

*Primary Examiner* — Thomas A Hollweg
*Assistant Examiner* — Mary A El-Shammaa
(74) *Attorney, Agent, or Firm* — Helix Patent Services LLC

(57) ABSTRACT

The present disclosure relates to a system for growing crops/plants under canopy of trees or shades. Embodiments of the disclosure provide a sun light Capturing Unit, sun light tubes to channel the captured sun light and a rotating bent part in sun tube that can be rotated to direct captured sun light to the desired direction. An embodiment also provides mechanism to rotate the bent part.

8 Claims, 3 Drawing Sheets

(56) References Cited

U.S. PATENT DOCUMENTS

| | | | | |
|---|---|---|---|---|
| 7,639,423 B2* | 12/2009 | Kinney | | F21S 11/00 |
| | | | | 359/591 |
| 7,926,481 B2* | 4/2011 | Edwards | | A01G 9/243 |
| | | | | 126/704 |
| 7,954,281 B2 | 6/2011 | Jaster | | |
| 8,371,075 B2* | 2/2013 | Huber | | E04H 9/023 |
| | | | | 52/167.1 |
| 8,837,048 B2* | 9/2014 | Jaster | | G02B 17/00 |
| | | | | 359/592 |
| 8,905,586 B2* | 12/2014 | O | | F21S 11/00 |
| | | | | 359/598 |
| 9,816,676 B2* | 11/2017 | Jaster | | F21S 11/007 |
| 2006/0174867 A1 | 8/2006 | Schaafsma | | F24S 23/70 |
| | | | | 126/683 |
| 2007/0035841 A1* | 2/2007 | Kinney | | F21S 11/00 |
| | | | | 359/592 |
| 2010/0084017 A1* | 4/2010 | Walden, Sr. | | G01S 3/7861 |
| | | | | 136/259 |
| 2011/0017199 A1* | 1/2011 | Hernandez | | F21S 11/00 |
| | | | | 126/605 |
| 2011/0132434 A1* | 6/2011 | Correia | | F24J 2/055 |
| | | | | 136/248 |
| 2011/0157733 A1* | 6/2011 | Werner | | F24J 2/14 |
| | | | | 359/871 |
| 2011/0253195 A1* | 10/2011 | Kim | | F24J 2/541 |
| | | | | 136/246 |
| 2012/0111389 A1* | 5/2012 | Park | | A01G 9/243 |
| | | | | 136/246 |
| 2012/0125399 A1* | 5/2012 | Schatz | | F16H 25/186 |
| | | | | 136/246 |
| 2012/0152233 A1* | 6/2012 | Masuda | | F24J 2/14 |
| | | | | 126/606 |
| 2012/0318328 A1* | 12/2012 | Boyle | | F24J 2/055 |
| | | | | 136/248 |
| 2013/0135744 A1* | 5/2013 | Jaster | | G02B 17/00 |
| | | | | 359/597 |
| 2016/0047877 A1* | 2/2016 | Trujillo | | G01S 3/7861 |
| | | | | 250/203.4 |

\* cited by examiner

SYSTEM FOR GROWING PLANT UNDER SHADE

FIELD OF THE INVENTION

The present disclosure relates to the technical field of collection and utilization of solar energy. More particularly, the present disclosure pertains to sun tubes to channel sunlight to plants and crop growing in shade.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

It is well known that it is virtually impossible to grow anything under shadow of big canopy of trees. This phenomenon acquires importance when we think of fertile land under fruit trees in orchids going waste as it cannot be used productively. In alternate scenario, space above big fields growing crops such as wheat, rice etc. is not utilized for productive purpose as planting of trees to utilize that space shall affect the crop output.

While it is possible to cultivate crops along with trees such as papaya that do not have dense canopy, trees having dense canopy cast a dense shadow on the ground under which it is not possible to grow crops. Same is the case with grape plantations where grape producing vines supported on stands cast a dense shadow and do not allow productive use of land below.

Thus, vast stretches of fertile land remains unutilized. These stretches of land, if utilized gainfully, can help grow additional agricultural output and can be a boon for societies dependent on imports for their agricultural product requirements.

Though various efforts have been made to channel sunlight, they mostly pertain to requirement of interiors of residential and/or commercial buildings and do not address specific need of providing sun light evenly as is the requirement for growing crop in a shaded area such as under the canopy of trees or under the stands of grape producing vines.

There is therefore a need for providing devices that can channel sun light under shadow of trees so that the uncultivated fertile land under trees can be gainfully utilized. Such a device shall provide following advantages and therefore can bring overall prosperity to individual farmers and society at large.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE INVENTION

An object of the present disclosure is to provide a system for growing crops/plants under shaded regions.

Another object of the present disclosure is to provide a source of additional income for farmers without increasing their land holding.

Yet another object of the present disclosure is to provide a system that leads to higher yield from land by making one time investment in equipment.

An object of the present disclosure is to provide a system that enhances yield from land without increase in operating expenses.

Another object of the present disclosure is to provide a device that captures sunlight from above the canopy of trees, and channels it to ground distributing it evenly for growth of plants grown there.

Yet another object of the present disclosure is to provide a device with rotating bent part that can direct captured sun light in the desired direction.

Yet another object of the present disclosure is to provide a solar panel that generates power to meet the power requirement of the sun light capturing and channeling equipment.

SUMMARY OF THE INVENTION

Aspects of the present disclosure relate to an equipment that can provide sun light to the region under canopy of trees so that the land under shade can be used for cultivating crops. In an aspect the equipment comprises a sun light capturing unit attached to upper end of a solar tube, wherein the sun light capturing unit can be dome shaped. In another aspect, inner surface of the solar tube can be lined with a reflecting material such that the sunlight captured by the dome shaped capturing unit is channelled along the tube from its upper end to lower end.

In another aspect, the present disclosure provides a lower bent portion that is rotatablly attached to the lower end of the sun tube such that the sunlight channelled down along the sun tube is directed by the bent portion in the desired direction. In another aspect, the rotatably attached bent portion can be rotated to change the direction in which the sun light is directed.

In yet another aspect, the disclosure provides a mechanized means to rotate the bent portion, wherein the means comprise a ring gear configured on the bent portion and a pinion such that the pinion is driven by a motor through a gear box so as to get a desirable rotational speed for the bent portion.

In another aspect, the disclosure also provides means to generate power to drive the motor, wherein the power generating means are at least one solar panel that converts solar energy to electrical energy to meet the power requirement to drive the bent portion. In yet another aspect, the disclosure provides for placing of sensors to identify area needing sun light and directing the bent portion in appropriate direction by actuating the rotating means. In an alternate aspect, the rotating means can be programmed to follow a Diurnal cycle for the bent portion so that entire area covered by the equipment gets covered by supply of sun light each day.

In another aspect, the disclosure also provides means to support the sun tube. Bent portion and the rotating means can be supported by means of a frame that can be used to provide support to the solar tube. Further, the bent portion can be supported on the frame through a set of rollers configured between rims/flanges configured on bent portion and frame.

Various objects, features, aspects and advantages of the inventive subject matter will become more apparent from the following detailed description of preferred embodiments, along with the accompanying drawing figures in which like numerals represent like components

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

Embodiments described herein pertain to equipment that can provide sun light to the region under canopy of trees so that the land under shade can be used for cultivating crops. Embodiments provide a sun light capturing unit configured on upper end of a sun tube and a bent portion configured at the lower end of the sun tube to direct the sun light in desired direction.

Figure 1:
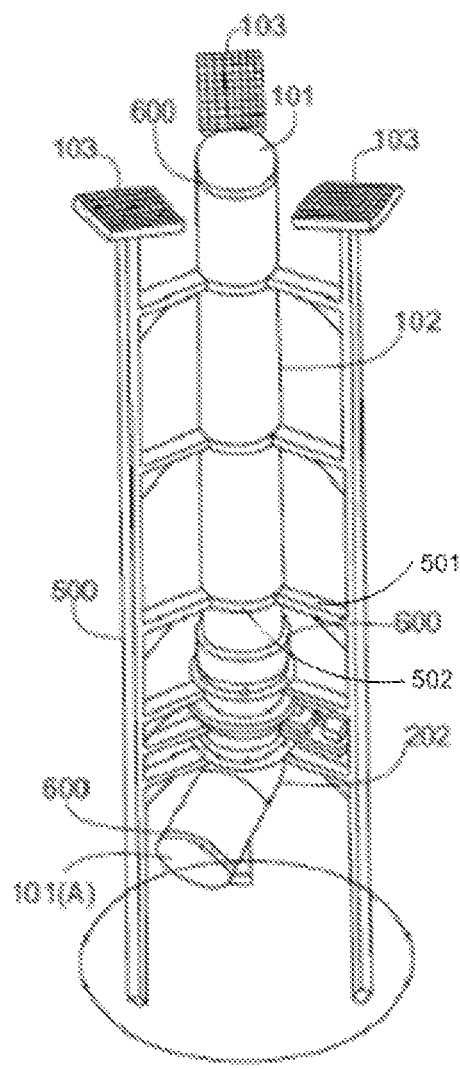
FIG. 1 illustrates an exemplary schematic view of the sun light channeling equipment for growing plants under shade in accordance with embodiments of the present disclosure.

FIG. 1 illustrates an exemplary schematic view of the sun light channeling equipment 100 for growing plants under shade in accordance with embodiments of the present disclosure. The schematic view depicts a sun light capturing unit 101, which is preferably dome shaped. The capturing unit 101 can be configured on upper end of a sun tube 102 (interchangeably referred to as solar tube hereinafter) with help of an air tight rubber seal. In an aspect, the sun light capturing unit 101 can be placed so as to capture maximum sunlight. Dome of the unit 101 can face the sun, and can be at a point higher when compared with the trees and shading objects surrounding it.

In another aspect, the sun light capturing unit 101 can be dome shaped and its thickness can depend upon its diameter, wherein a larger diameter dome shall require more thickness of the dome. Size of the dome can also depend on requirement of the sun light, and may also depend upon space available. In an aspect of the present disclosure, the sunlight capturing unit 101 can be made of polycarbonate or any other suitable material.

In an embodiment, upper side of the sun tube 102 can be stationary and its lower part can rotate relative to the upper part. In another exemplary aspect, the lower rotatable bent part 202 can be bent such that rotation of the lower part can direct the sun light dispersing unit 101(A) attached to the lower end of the sun tube 102, in the desired direction. In an embodiment, the bent portion 202 can be rotated by means of a rotating mechanism that allows the lower bent portion 202 of the sun/solar tube 102 to rotate about its longitudinal/central axis.

In an embodiment, joints between the solar tube 102 and the sun light receiving unit 101, between bent portion 202 and solar tube 102, and that between bent portion 202 and sun light dispersing unit 101(A) can be configured with gaskets 600 to avoid entrance of dust and dirt that can otherwise affect the reflectivity of the inner lining of the sun tube 102.

In an embodiment, the sun/solar tube 102 can be made of any suitable material such as steel sheet provided with corrosion resistant treatment or a suitable polymeric material. The solar tube 102 can be highly reflective from inside so as to direct the sun light captured by sun light capturing unit 101 to lower end of the sun tube 102. For this, there can be a reflective lining of suitable reflecting material such as aluminium having suitable thickness say 1 mm to 5 mm, that is capable of reflecting and channeling up to 99.9% of sunlight captured by the capturing unit 101.

In another aspect, the sun/solar tube 102 can have diameter varying from 50 mm to 1500 mm depending upon the size of area to be provided sun light and amount of sun light required. In a preferred embodiment, sun/solar tube 102 can have any diameter. In another aspect, the height of the solar tube can depend on the height of trees canopy covering the cultivation area. The height should be sufficient so as to expose the light capturing unit 101 to the sun.

As depicted in FIG. 1, the solar tube 102 can be supported on a fabricated support structure that can be a stand/frame like structure fabricated out of rust proof material such as galvanized or painted steel sections. Length and sizes of stand/frame like body can correspond to the diameter of sun tube 102 and height of dome/length of Sun tubes. The support structure can include at least three long vertically placed pipes/C sections 500. The iron pipes can have horizontal arms 501 with rings 502 at their end to circumferentially hold the solar tube 102.

In another embodiment, a plurality of solar panels 103 can be provided at top end of structural pipes 500. These solar panels 103 can generate electricity to meet the power requirement of the equipment in respect of rotation of the bent portion 202.

Figure 2:
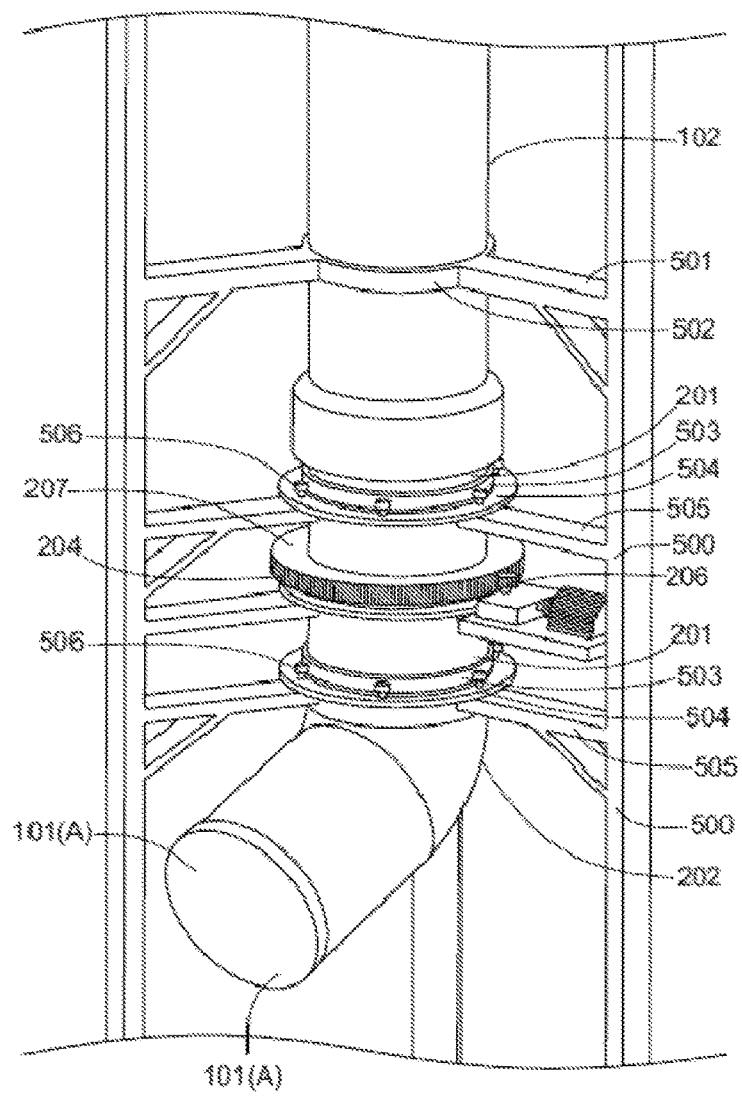
FIG. 2 illustrates an exemplary schematic view of the support arrangement for aligning the solar tube and bent portion of the sun light channeling equipment in accordance with embodiments of the present disclosure.

FIG. 2 illustrates an exemplary schematic view of the support arrangement for aligning the solar tube and bent portion of the sun light channeling equipment in accordance with embodiments of the present disclosure. The upper end part 201 of bent tube 202 can have a ring 503 fixed on its outer circumference. The ring 503 can be machined for uniform dimensions to ensure smooth rotation. A rim 504 can be fixed with supports 505 from structural pipes 500. A plurality of small bearings 506 are attached to rim 504 as shown in FIG. 2 to circumferentially support the upper end part 201 of bent tube 202 and prevent its drift in radial direction. In the preferred embodiment there can be more than six small bearings 506. Same mechanism can be provided with bent portion 202 to ensure that it rotates in an aligned manner.

Figure 3:
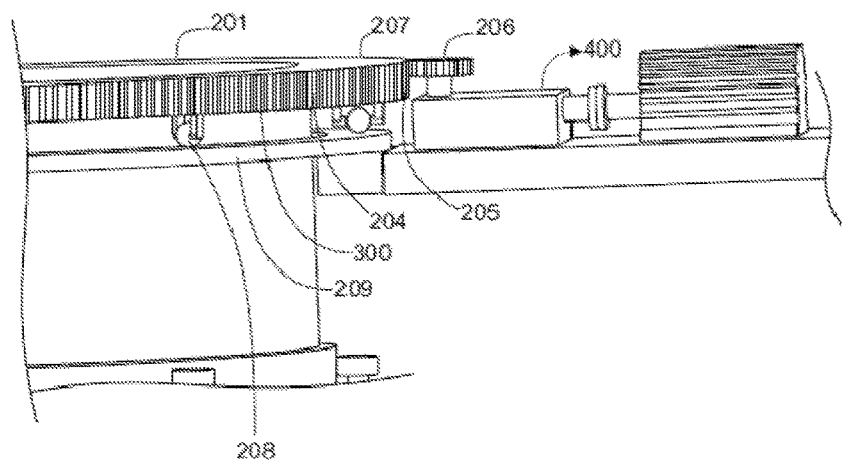
FIG. 3 illustrates an exemplary schematic view of the drive mechanism for rotating the bent portion of the sun light channeling equipment in accordance with embodiments of the present disclosure.

FIG. 3 illustrates an exemplary schematic view of the drive mechanism for rotating the bent portion of the sun light channeling equipment in accordance with embodiments of the present disclosure. In an embodiment, the upper end part 201 of the bent tube 202 of the solar tube 102 can be configured with protruded rim 207 that can have circumferential gear 204 in engagement with a pinion 206. A plurality of rollers 208 can be attached to the lower part 300 of the protruded rim 207. The rollers 208 are configured to move over a smooth protruded surface 209 that can protrude below the protruded rim 207. In a preferred embodiment, there can be more than six rollers 208 so as to provide proper support. However as would be apparent to one skilled in art, the numbers of roller 208 shall depend on the diameter of sun tube 102 and many other such factors. The pinion 206 is powered by a motor coupled with gear box 400. In an embodiment of the present disclosure the motor can runs on power supply received from solar panel 103. The above described rotating mechanism can provide a smooth, durable, low maintenance movement of lower bent portion 202 of the solar tube 102. In an alternate embodiment, power for driving the rotation mechanism can be provided from normal sources.

It is to be understood that drive mechanism described above is only exemplary and it is possible to provide rotational motion to the bent part 202 in many other ways, which shall be apparent to a person skilled in art and all such mechanisms are well within the scope of the present disclosure.

In an embodiment the rotation of the bent portion 202 can be controlled based on sensors placed in the field to detect areas of deficient sun light such that bent portion 202 is rotated to direct sun light captured by sun light capturing unit 101 to the sun light deficient parts. In an alternate embodiment, the bent portion 202 can be rotated in cyclic manner, with the use of sensors which directs movement of the bent portion 202 based on diurnal time duration.

Thus the embodiments of the present disclosure provide an equipment that can provide sun light to the region under canopy of trees so that the land under shade can be used for cultivating crops. The equipment comprises a bent portion at the lower end of the sun tubes that can rotate to direct captured sun light in desired direction thus providing means to provide sun light on as required basis to ensure proper productivity.

According to one embodiment, length of the lower bent pipe can be changed as and when desired by the user. For instance, when the crop is of small length; like few days after germination, the lower bent pipe can be replaced with a long length pipe, and when the crop attains full height, a smaller length bent pipe can be fitted to unit. Therefore the lower bent pipe portion can be detachably connected with the solar tube and detached and replaced with another bent pipe as and when desired.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides a system for growing crops/plants under shaded regions.

The present invention provides be source of additional income for farmers without increasing their land holding.

The present disclosure provides a system that leads to higher yield from land by making one time investment in equipment.

The present disclosure provides a system that enhances yield from land without increase in operating expenses.

The present disclosure provides a device that captures the sun light from above the canopy of trees and channels it to ground distributing it evenly for growth of plants grown there.

The present disclosure provides a device with rotating bent part that can direct captured sun light in the desired direction.

The present disclosure provides solar panel that generates power to meet the power requirement of the sun light capturing and channeling equipment.

We claim:

1. An equipment for capturing and channelling sun light under a shaded region, said equipment comprising: a sun light capturing unit attached to an upper end of a solar tube; a bent portion configured on a lower end of said solar tube, wherein said upper end of said solar tube is stationary and is positioned above a tree line of a canopy of trees, and said lower end is positioned proximal to the ground under the canopy of trees, wherein said solar tube is configured to direct said sun light to said lower end, wherein said bent portion is configured to rotate relative to said upper end of said solar tube by means of a drive mechanism, such that, said rotation of said bent portion causes the sun light to be directed in a desired direction and wherein one or more sensors are configured to be operatively coupled with said equipment in order to guide said rotation of said bent portion in desired areas, said one or more sensors being configured to detect areas of deficient sun light.

2. The equipment of claim 1, wherein said drive mechanism comprises a gear configured on said bent portion and a pinion driven by a motor.

3. The equipment of claim 1, wherein said sun light capturing unit is dome shaped.

4. The equipment of claim 1, wherein said solar tube and said bent portion are supported on a frame structure.

5. The equipment of claim 1, wherein said bent portion is supported on a frame structure by means of a plurality of rollers.

6. The equipment of claim 1, wherein said solar tube and said bent portion are aligned by means of a plurality of bearings.

7. The equipment of claim 1, wherein said equipment is configured with at least one solar panel to power said drive mechanism.

8. The equipment of claim 1, wherein said solar tube is lined with a reflective material and said reflective material is aluminum.

* * * * *